United States Patent Office 2,874,173
Patented Feb. 17, 1959

2,874,173

ESTRONE COMPOUNDS

John A. Hogg, Kalamazoo Township, Kalamazoo County, and Jerome Korman, Portage Township, Kalamazoo County, Mich., assignors to The Upjohn Company, Kalamazoo, Mich., a corporation of Michigan No Drawing. Application December 17, 1956
Serial No. 628,477

7 Claims. (Cl. 260—397.45)

This invention relates to steroid compounds and is more particularly concerned with novel estrone compounds represented by the structural formula

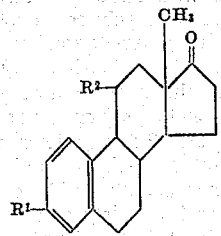

wherein $R^1$ is selected from the group consisting of hydroxy, etherified hydroxy, and esterified hydroxy; and $R^2$ is selected from the group consisting of $\alpha$- and $\beta$-hydroxy, esterified $\alpha$- and $\beta$-hydroxy, keto, and hydrogen attached to a 9(11)-double bond.

This application is a continuation-in-part of our copending application Serial No. 406,364, filed January 26, 1954, now U. S. Patent No. 2,774,775.

It is an object of the present invention to provide the novel estrone compounds of the foregoing formula, as herein described, which compounds, e. g. 3-methoxy-1,3,5(10),9(11)-estratetraen-17-one, etc., have estradiol-like activity, e. g. estrogenic activity, and are further useful in the production of compounds having estrogenic activity, e. g. 3-hydroxy-1,3,5(10),9(11)-estratetraen-17-one is converted to estrone by hydrogenation of the 9(11)-double bond, or other hormone activity, e. g. by the Birch reduction method 3-methoxy-11$\beta$-hydroxy-1,3,5(10)-estratrien-17-one is converted to 11$\beta$-hydroxy-19-nortestosterone, 3-methoxy-1,3,5(10),9(11)-estratetraen-17-one is converted to 19-nortestosterone, etc. Other objects and uses will be apparent to one skilled in the art.

In the compounds of the present invention as represented by the foregoing structural formula preferably the etherified and esterified hydroxy groups are hydrocarbonoxy [hydrocarbon-O—] and hydrocarboyloxy

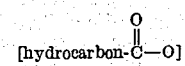

radicals, respectively, each containing less than twelve carbon atoms. In an especially preferred embodiment of this invention said radicals are alkoxy and alkanoyloxy radicals, respectively, each containing less than nine carbon atoms. The most preferred embodiment of said radicals are methoxy and acetoxy, respectively. Illustrative etherified hydroxy radicals are methoxy, ethoxy, propoxy, butyroxy, valeroxy, hexoxy, heptoxy, octanoxy, $\beta$-trichloro-$\alpha$-acetylethoxy, chloromethoxy, $\beta$-hydroxy ethyleneoxy, dimethylmethoxy, diethylmethoxy, isobutyroxy, isovaleroxy, $\alpha$-tetrahydropyranyloxy, $\alpha$- and $\beta$-naphthyloxy, cyclohexyloxy, cyclopentyloxy, $\beta,\beta$-dicarbethoxy ethenyloxy, $\beta$-ketocyclohexenyloxy, $\alpha,\beta$-dimethylethoxy, $\alpha,\beta$- and $\beta,\beta$-diethylethoxy, benzoxy, ortho, meta and para-tolyloxy, $\alpha$- and $\beta$-phenylethyloxy, $\beta$-indolyloxy, $\alpha$-furyloxy, $\alpha$- and $\beta$-cyclohexylethyleneoxy, ortho, meta and para-nitrobenzoxy, ortho, meta and para-aminobenzoxy, etc. Illustrate esterified hydroxy radicals are those containing acyl radicals of the acids formic, propionic, butyric, isobutyric, valeric, isovaleric, trimethylacetic, 2-methylbutyric, 3-ethylbutyric, hexanoic, diethylacetic, triethylacetic, heptanoic, octanoic, optically active abietic, $\alpha$-ethylisovaleric, cyclopropylideneacetic, cyclopentylformic, cyclopentylacetic, $\alpha$- and $\beta$-cyclopentylpropionic, cyclohexylformic, cyclohexylacetic, $\alpha$- and $\beta$-cyclohexylpropionic, benzoic, 2,3- or 4-methylbenzoic, 2,3-, 2,4-, 2,5-, 2,6-, 3,4-, and 3,5-dimethylbenzoic, ethylbenzoic, 2,4,6-trimethylbenzoic, 2,4,6-triethylbenzoic, $\alpha$-naphthoic, 3-methyl-$\alpha$-naphthoic, phenylacetic, $\alpha$- and $\beta$-phenylpropionic, diphenylacetic, triphenylacetic, succinic, glutaric, $\alpha$-methylglutaric, $\beta$-methylglutaric, $\beta,\beta$-dimethylglutaric, adipic, pimelic, suberic, glycolic, lactic, citric, tartaric, d-maleic, d-glyceric, malonic, gluconic, salicylic, glycine, diglycollamic, triglycollamic, methylglycine, dimethylglycine, diethylglycine, para-aminosalicylic, para-aminobenzoic, ethylmercaptoacetic, benzylmercaptoacetic, cyanoacetic, chloroacetic, fluoroacetic, trichloroacetic, trifluoroacetic, thioglycolic, 2,3,4-trimethoxybenzoic, $\alpha$-naphthoxyacetic, $\beta$-pyrrolidylpropionic, carbamic acid, phenylcarbamic, n-butylcarbamic, dimethylcarbamic, diethylcarbamic, allophanic, $\beta$-furylcarboxylic, N-methylpyrrolidyl-2-carboxylic, $\alpha$-picolinic, indole-2-carboxylic, 6-hydroxyindolyl-3-acetic, N-methylmorpholyl-2-carboxylic, pyrrolyl-2-carboxylic, etc.

Illustrative compounds of the present invention are the following wherein etherified and esterified hydroxyl groups are those specified in the foregoing description: 3,11$\alpha$(and $\beta$)-dihydroxy-1,3,5(10)-estratrien-17-one (i. e. 11$\alpha$- and 11$\beta$-hydroxyestrone) and 3- and 11-monoesters and 3,11-diesters thereof; 3-etherified 3,11$\alpha$(and $\beta$)-dihydroxy-1,3,5(10)-estratrien-17-one (i. e. 11$\alpha$- and 11$\beta$-hydroxyestrone 3-ether) and 11-monoesters thereof; 3-hydroxy-1,3,5(10)-estratriene-11,17-dione (i. e. 11-ketoestrone) and the 3-ethers and 3-monoesters thereof; 3-hydroxy-1,3,5(10),9(11)-estratetraen-17-one (i. e. 9(11)-dehydroestrone) and the 3-ethers and 3-monoesters thereof.

In preparing the compounds of this invention a starting $\Delta^{1,4}$-3-ketosteroid of the pregnane series having appropriate substitution at the 11-position is converted to a $\Delta^{1,3,5(10)}$-3-hydroxy-17-ketosteroid of the estrane series by aromatization of the A-ring and oxidation of the 17-side chain of the starting steroid. This can be accomplished by the method described in our copending application Serial No. 406,364, e. g. methyl 11$\alpha$-hydroxy-3-keto-1,4,17(20)-pregnatrien-21-oate is aromatized to produce methyl 3,11$\alpha$-dihydroxy-19-nor-1,3,5(10),17(20)-pregnatetraen-21-oate which, after esterification of the 3- and 11-hydroxy groups, is oxidized at the 17-position to produce 3,11$\alpha$-diacetoxy-1,3,5(10)-estratrien-17-one, as illustrated in Example 1. Modifications of this method also can be employed to produce compounds of the present invention, as illustrated in the examples. Various other conversions, e. g. esterification, etherification, ester hydrolysis, ether hydrolysis, dehydration, oxidation of hydroxy groups to keto groups, etc., are employed, when appropriate or desired, to produce compounds of this invention, as also illustrated in the examples. The starting compounds of this invention can be prepared as described in our copending application Serial No. 406,364.

The following examples are illustrative only and are not to be construed as limiting the scope of the present invention.

EXAMPLE 1

3,11$\alpha$-diacetoxy-1,3,5(10)-estratrien-17-one

A pyrolysis tube of hard glass (Vycor) two centimeters in diameter and fifty centimeters long is packed with three-ring hard glass (Pyrex) helices. Under nitrogen pressure a solution of 5.5 grams of methyl 11α-hydroxy-3-keto-1,4,17(20)-pregnatrien-21-oate in a mixture of 500 milliliters of freshly distilled tetralin and fifty milliliters of heavy mineral oil (viscosity 85) is passed through the tube heated at approximately 550 degrees centigrade at the rate of ten milliliters per minute. The effluent is collected in a flask cooled by water-ice and vented to an exhaust system for the removal of gaseous by-products. The cooled effluent liquid obtained is chromatographed over 200 grams of magnesium silicate (Florisil) using acetone-hexane (Skellysolve B) mixtures for elution, the combined fractions obtained with solvent containing thirteen percent acetone and sixteen percent acetone providing 2.65 grams of oily methyl 3,11α-dihydroxy-19-nor-1,3,5(10),17(20)-pregnatetraen-21-oate.

A solution of 3.1 grams of the methyl 3,11α-dihydroxy-19-nor-1,3,5(10),17(20)-pregnatetraen-21-oate and a large excess of acetic anhydride in dry pyridine solvent is maintained at room temperature for approximately eighteen hours. The solution then is poured into a mixture of ice and water to obtain oily product which is extracted with methylene dichloride. Chromatographic purification over 200 grams of magnesium silicate (Florisil) using acetone-hexane (Skellysolve B) mixtures for elution provides 3.2 grams of oily methyl 3,11α-diacetoxy - 19 - nor - 1,3,5(10),17(20) - pregnatetraen-21-oate from combined fractions eluted with hexane (Skellysolve B) containing three and six percent acetone.

In the same manner are prepared, using the appropriate acylating agent, other methyl 3,11α-diacyloxy-19-nor-1,3,5(10),17(20)-pregnatetraen-21-oates, including those wherein the 3 and 11α-acyloxy radicals are the esterified hydroxy groups named in the foregoing description.

The 3.2 grams of methyl 3,11α-diacetoxy-19-nor-1,3,5(10),17(20)-pregnatetraen-21-oate is dissolved in 200 milliliters of methylene dichloride, cooled in a Dry Ice-acetone bath and ozonized with a slight excess over one-molar equivalent of ozone. The ozonide obtained is decomposed in the usual manner by addition of acetic acid and powdered zinc in excess. After completion of the decomposition reaction, about one hour, the excess zinc is removed by filtration and the solvents evaporated from the filtrate. The residual oil is dissolved in methylene dichloride, washed with dilute aqueous hydrochloric acid solution, dried over anhydrous sodium sulfate, and chromatographed over 250 grams of magnesium silicate (Florisil). A fraction eluted with hexane (Skellysolve B) containing nine percent acetone provides one gram of 3,11α-diacetoxy-1,3,5(10)-estratrien-17-one. After several recrystallizations from methanol the compound melts at 172 to 173 degrees centigrade.

*Analysis.*—Calc'd for $C_{22}H_{28}O_5$: C, 71.33; H, 7.08. Found: C, 71.36; H, 6.95.

In the same manner are prepared other 3,11α-diacycloxy - 1,3,5(10) - estratrien - 17 - ones, including those wherein the 3 and 11α-acyloxy radicals are the esterified hydroxy groups named in the foregoing description.

A solution of 310 milligrams of 3,11α-diacetoxy-1,3,5(10)-estratrien-17-one in five milliliters of benzene and fifteen milliliters of ether is added to 0.5 grams of lithium aluminum hydride in fifty milliliters of ether. The reaction mixture obtained is heated for one hour under reflux and then hydrolyzed by addition of dilute aqueous hydrochloric acid solution. The crude solid obtained weighs 213 milligrams. Recrystallization from methanol-ethyl acetate mixture and from ethyl acetate alone provides highly purified 3,11α,17β-trihydroxy-1,3,5(10)-estratriene melting at 250 to 251 degrees centigrade.

*Analysis.*—Calc'd for $C_{18}H_{24}O_3$: C, 74.97; H, 8.39. Found: C, 75.27; H, 8.23.

In the same manner other 3,11α-diacyloxy-1,3,5(10)-estratrien-17-ones including those wherein the 3- and 11α-acyloxy radicals are the esterified hydroxy groups named in the foregoing specification, are converted to 3,11α,17β-trihydroxy-1,3,5(10)-estratriene.

3,11α,17β - trihydroxy - 1,3,5(10) - estratriene is converted to 11α-hydroxy-19-nortestosterone as shown in Example 2.

EXAMPLE 2

*3,11α-dihydroxy-1,3,5(10)-estratrien-17-one*

A solution of methyl 11α-hydroxy-3-keto-1,4,17(20)-pregnatrien-21-oate in methylene dichloride cooled in a Dry Ice-acetone bath is treated with about a ten percent excess of ozone, and the ozonide thus obtained is decomposed by stirring with a large excess of acetic acid and powdered zinc at room temperature for about one hour. The remaining zinc is removed by filtration, and the filtrate is washed with dilute aqueous hydrochloric acid solution and dried over anhydrous sodium sulfate. The dried solution is chromatographed over magnesium silicate (Florisil), the 11α-hydroxy-1,4-androstadiene-3,17-dione being eluted with hexane (Skellysolve B) containing twelve to fifteen percent acetone.

A pyrolysis tube of 2.5-centimeter diameter hard glass (Vycor) is mounted vertically and packed with one-millimeter diameter and five-millimeter long hard glass (Vycor) rings, and a thirty-centimeter length of the pyrolysis tube is heated by a combustion furnace. The influent liquid is forced by nitrogen gas under pressure from a reservoir through a flowmeter into the pyrolysis tube. The effluent gases and liquid are collected in a receiver cooled in ice and vented to an exhaust system. Reaction temperatures are measured by a thermocouple mounted inside the tube immediately outside of the heated zone exit, providing the temperature of the effluent liquid, and a thermocouple mounted between the pyrolysis tube and the furnace. A suspension of one gram of 11α-hydroxy-1,4-androstadiene-3,17-dione in 100 milliliters of heavy mineral oil is prepared by efficient mixing (Waring Blendor for fifteen minutes), and the suspension is passed through the pyrolysis tube at a rate of ten milliliters per minute maintaining the temperature of the thermocouple between the pyrolysis tube and the furnace reading at 600 degrees centigrade. After completion of the pyrolysis reaction, the cooled effluent liquid is diluted with ether and extracted with five percent aqueous sodium hydroxide solution, the extract acidified with dilute aqueous hydrochloric acid, and the acidified aqueous solution extracted with methylene chloride. Distillation of the methylene chloride gives 3,11α-dihydroxy-1,3,5(10)-estratrien-17-one. Recrystallization of this compound from ethyl acetate provides purified material.

The 3,11α-dihydroxy-1,3,5(10)-estratrien-17-one is reduced with lithium aluminum hydride to 3,11α,17β-trihydroxy-1,3,5(10)-estratriene following the procedure of Example 1 for reducing 3,11α-diacetoxy-1,3,5(10)-estratrien-17-one to 3,11α,17β-trihydroxy-1,3,5(10)-estratriene, the compounds obtained being identical, melting point 250 to 251 degrees centigrade.

A solution of 520 milligrams of the 3,11α,17β-trihydroxy-1,3,5(10)-estratriene in a mixture of 25 milliliters of methanol and five milliliters of water containing three grams of potassium hydroxide is cooled to five degrees centigrade and four additions of 1.5 milliliters each of dimethylsulfate are made at thirty-minute intervals. The methanol solvent is then removed in a stream of air providing partially crystalline product. Chromatographic purification of a methylene dichloride solution of the product over forty grams of magnesium silicate (Florisil) gives 400 milligrams of product eluted with hexane (Skellysolve B) containing twenty percent acetone. Two recrystallizations from ether provides purified 3-methoxy-11α,17β-dihydroxy-1,3,5(10)-estratriene melting at 144 to 145 degrees centigrade.

*Analysis.*—Calc'd for $C_{19}H_{26}O_3$: C, 75.46; H, 8.67. Found: C, 75.56; H, 8.70.

In the same manner are prepared, using the appropriate etherifying agent, other 3-etherified 3,11α,17β-trihydroxy-1,3,5(10)-estratrienes, including those wherein the 3-ether radicals are the etherified hydroxy radicals named in the foregoing description.

Four hundred milligrams of lithium metal is added to a solution of 400 milligrams of the 3-methoxy-11α,17β-dihydroxy-1,3,5(10)-estratriene in a mixture of 35 milliliters of anhydrous ether and 25 milliliters of liquid ammonia cooled in a Dry Ice-acetone bath. When the metal is dissolved, four milliliters of absolute ethanol is added during a thirty-minute period. The ammonia then is evaporated and water added. The oily product obtained is dissolved in a mixture of 25 milliliters of methanol, three milliliters of water and one milliliter of concentrated hydrochloric acid, and heated under reflux for thirty minutes. Evaporation of the methanol solvent provides crude product which, dissolved in methylene dichloride, is chromatographed over magnesium silicate (Florisil) to provide 178 milligrams of product melting at 168 to 172 degrees centigrade, the product being eluted with a mixture of equal parts of acetone and hexane (Skellysolve B). Recrystallization of this product from acetone provides 11α-hydroxy-19-nortestosterone melting at 179 to 181 degrees centigrade.

EXAMPLE 3

*3-methoxy-11α-hydroxy-1,3,5(10)-estratrien-17-one*

3,11α-dihydroxy-1,3,5(10)-estratrien-17-one (prepared as in Example 2) is methylated by treatment with dimethylsulfate and alkali to obtain 3-methoxy-11α-hydroxy-1,3,5(10)-estratrien-17-one following the procedure of Example 2 for the methylation of 3,11α,17β-trihydroxy-1,3,5(10)-estratriene to produce 3-methoxy-11α,17β-dihydroxy-1,3,5(10)-estratriene.

In the same manner are prepared, using the appropriate etherifying agent, other 3-etherified 3,11α-dihydroxy-1,3,5(10)-estratrien-17-ones, including those wherein the 3-ether radicals are the etherified hydroxyl radicals named in the foregoing description.

By lithium aluminum hydride reduction 3-methoxy-11α-hydroxy-1,3,5(10)-estratrien-17-one is converted to 3-methoxy-11α,17β-dihydroxy-1,3,5(10)estratriene following the procedure of Example 1 for the reduction of 3,11α-diacetoxy-1,3,5(10)-estratrien-17-one to 3,11α,17β-trihydroxy-1,3,5(10)-estratriene. The 3-methoxy-11α,17β-dihydroxy-1,3,5(10)-estratriene obtained is identical with the same compound prepared by another procedure in Example 2 and is convertible to 11α-hydroxy-19-nortestosterone, melting point 180 to 181 degrees centigrade as shown in Example 2.

In the same manner are prepared other 3-etherified 3,11α,17β-trihydroxy-1,3,5(10)-estratrienes, including those wherein the 3-ether radicals are the etherified hydroxyl radicals named in the foregoing description.

EXAMPLE 4

*3-methoxy-11α-acetoxy-1,3,5(10)-estratrien-17-one*

Acetylation of 3-methoxy-11α-hydroxy-1,3,5(10)-estratrien-17-one (from Example 3) with excess acetic anhydride in dry pyridine solvent at room temperature for approximately eighteen hours provides 3-methoxy-11α-acetoxy-1,3,5(10)-estratrien-17-one, the procedure being the same as for the acetylation of methyl 3,11α-dihydroxy-19-nor-1,3,5(10),17(20)-pregnatetraen-21-oate to produce methyl 3,11α-diacetoxy-19-nor-1,3,5(10),7(20)-pregnatetraen-21-oate as described in Example 1.

In the same manner are prepared, using the appropriate acylating agent, other 3-etherified 3-hydroxy-11α-acyloxy-1,3,5(10)-estratrien-17-ones, including those wherein the 3-ether radicals are the etherified hydroxyl radicals named in the foregoing description and the 11α-acyloxy radicals are the esterified hydroxyl radicals named in the foregoing description.

Reduction of 3-methoxy-11α-acetoxy-1,3,5(10)-estratrien-17-one with lithium and liquid ammonia following the procedure of Example 2 for the conversion of 3-methoxy-11α,17β-dihydroxy-1,3,5(10)-estratriene to 11α-hydroxy-19-nortestosterone also provides 11α-hydroxy-19-nortestosterone, the product produced being the same in both instances.

EXAMPLE 5

*3-hydroxy-1,3,5(10),9(11)-estratetraen-17-one*

Methyl 11α-hydroxy-3-keto-1,4,17(20)-pregnatrien-21-oate is acetylated with excess acetic anhydride in pyridine at room temperature for twelve hours and the reaction mixture then poured into a mixture of ice and water. The organic product, dissolved in methylene chloride, is chromatographed over magnesium silicate (Florisil) using hexane (Skellysolve B)-acetone for elution. The fraction eluted with hexane (Skellysolve B) containing eight percent acetone, after evaporation of solvent, provided crystalline methyl 11α-acetoxy-3-keto-1,4,17(20)-pregnatrien-21-oate. Recrystallized from ethyl acetate-hexane (Skellysolve B) mixture the compound melts at 140 to 142 degrees centigrade.

*Analysis.*—Calc'd for $C_{24}H_{30}O_5$: C, 72.32; H, 7.59. Found: C, 72.15; H, 8.01.

A solution of six grams of methyl 11α-acetoxy-3-keto-1,4,17(20)-pregnatrien-21-oate in methylene dichloride is treated with ten percent excess of ozone, the reaction flask being cooled in a Dry Ice-acetone bath. Then twenty milliliters of acetic acid and approximately one gram of powdered zinc is added and the mixture warmed to room temperature. The mixture then is stirred for one hour during which time four additional one-gram portions of powdered zinc are added. The excess zinc then is removed by filtration, and the methylene dichloride filtrate is washed with dilute aqueous hydrochloric acid solution and water and dried over anhydrous sodium sulfate. The dried solution is chromatographed over magnesium silicate (Florisil), the desired 11α-acetoxy-1,4-androstadiene-3,17-dione being eluted with hexane (Skellysolve B) containing fifteen percent acetone, yield 1.91 grams. Recrystallization twice from ethyl acetate provides compound melting at 246 to 248 degrees centigrade.

*Analysis.*—Calc'd for $C_{20}H_{26}O_4$: C, 73.66; H, 7.65. Found: C, 73.42; H, 7.68.

A suspension of 1.5 grams of 11α-acetoxy-1,4-androstadiene-3,17-dione in 150 milliliters of heavy mineral oil is pyrolyzed at a temperature of 600 degrees centigrade according to the procedure described in Example 2 for pyrolysis of 11α-hydroxy-1,4-androstadiene-3,17-dione to 3,11α-dihydroxy-1,3,5(10)-estratrien-17-one. The effluent pyrolyzed solution then is diluted with ether and the diluted solution extracted with five percent aqueous sodium hydroxide solution. Acidification of the alkaline extract followed by extraction with methylene chloride and distillation of the extraction solvent provides 710 milligrams of yellow crystalline product. Recrystallization of this product from ethyl acetate provides 300 milligrams of purified 3-hydroxy-1,3,5(10),9(11)-estratetraen-17-one melting at 249 to 253 degrees centigrade. Several further recrystallizations from ethyl acetate provide analytically pure material melting at 257 to 259 degrees centigrade.

*Analysis.*—Calc'd for $C_{18}H_{20}O_2$: C, 80.56; H, 7.51. Found: C, 80.59; H, 7.82.

The 3-hydroxy-1,3,5(10),9(11)-estratetraen-17-one is converted to estrone as follows: A solution of fifty milligrams of 3-hydroxy-1,3,5(10),9(11)-estratetraen-17-one in ten milliliters of glacial acetic acid and containing 25 milligrams of platinum oxide is shaken with hydrogen for thirty minutes. The catalyst then is removed by filtration and the solvent evaporated. The residue is recrystallized from ethyl acetate to provide twenty milligrams of estrone melting at 228 to 233 degrees centigrade.

EXAMPLE 6

*2,11β-dihydroxy-1,3,5(10)-estratrien-17-one and 3-hydroxy-1,3,5(10),9(11)-estratetraen-17-one*

According to the procedure described in Example 2 for the pyrolysis of 11α-hydroxy-1,4-androstadiene-3,17-dione to 3,11α-dihydroxy-1,3,5(10)-estratrien-17-one, a suspension of 1.69 grams of 11β-hydroxy-1,4-androstadiene-3,17-dione in 170 milliliters of heavy mineral oil is pyrolyzed at a temperature of approximately 600 degrees centigrade. The effluent liquid is diluted with ether and extracted with five percent aqueous sodium hydroxide solution. The aqueous alkaline solution is acidified and then extracted with methylene dichloride. The methylene chloride extract is chromatographed over magnesium silicate (Florisil), the product being eluted with hexane (Skellysolve B) containing fifteen percent acetone. Recrystallization twice from ethyl acetate provides 3,11β-dihydroxy-1,3,5(10)-estratrien-17-one melting at 255 to 258 degrees centigrade. A small amount of 3-hydroxy-1,3,5(10),9(11)-estratetraen-17-one, melting point 253 to 257 degrees centigrade, is isolated from the recrystallization mother liquors.

EXAMPLE 7

*3-methoxy-11β-hydroxy-1,3,5(10)-estratrien-17-one*

A solution of 150 milligrams of 3,11β-dihydroxy-1,3,5(10)-estratrien-17-one and 160 milligrams of potassium hydroxide in 1.6 milliliters of water and eight milliliters of methanol is prepared and 2.7 milliliters of dimethyl sulfate is added in small portions over a two-hour period. The solvent then is evaporated under vacuum. Trituration of the residue with water, followed by filtration provides 160 milligrams of 3-methoxy-11β-hydroxy-1,3,5(10)-estratrien-17-one.

In the same manner are prepared, using the appropriate etherifying agent, other 3-etherified 3,11β-dihydroxy-1,3,5(10)-estratrien-17-ones, including those wherein the 3-ether radicals are the etherified hydroxyl radicals named in the foregoing description.

Conversion of 3-methoxy-11β-hydroxy-1,3,5(10)-estratrien-17-one to 11β-hydroxy-19-nortestosterone is carried out as follows: To a solution of forty milligrams of 3-methoxy-11β-hydroxy-1,3,5(10)-estratrien-17-one in a mixture of one milliliter of ethanol, ten milliliters of ether and 25 milliliters of liquid ammonia is added 100 milligrams of lithium. After the lithium is reacted the ammonia is evaporated and the residue extracted with methylene dichloride and the methylene chloride then evaporated. This residue is dissolved in twenty milliliters of methanol, two milliliters of water and 0.5 milliliter of hydrochloric acid. After the solution has stood for fifteen minutes, it is neutralized with base and the methanol evaporated. The solid thus obtained, in methylene dichloride solution is chromatographed over magnesium silicate (Florisil), eluted with hexane (Skellysolve B) containing fifty percent acetone providing eighteen milligrams of 11β-hydroxy-19-nortestosterone.

EXAMPLE 8

*3-methoxy-11β-hydroxy-1,3,5(10)-estratrien-17-one*

Following the procedure of Example 5 for the conversion of methyl 11α-acetoxy-3-keto-1,4,17(20)-pregnatrien-21-oate to 11α-acetoxy-1,4-androstadiene-3,17-dione, 500 milligrams of 3-methoxy-19-nor-1,3,5(10),17(20)-pregnatetraene-11β,21-diol in methylene dichloride is ozonized, the ozonide decomposed with zinc and acetic acid and the product, in methylene dichloride solution, chromatographed over magnesium silicate (Florisil). An 155-milligram fraction eluted with hexane (Skellysolve B) containing ten percent acetone is recrystallized twice from methanol to give 3-methoxy-11β-hydroxy-1,3,5(10)-estratrien-17-one which softens at 160 degrees centigrade, resolidifies, and melts completely at 170 degrees centigrade.

*Analysis.*—Calc'd for $C_{19}H_{24}O_3$: C, 75.97; H, 8.06. Found: C, 76.09; H, 8.36.

In the same manner are prepared other 3-etherified 3,11β-dihydroxy-1,3,5(10)-estratrien-17-ones, including those wherein the 3-ether radicals are the etherified hydroxyl radicals named in the foregoing description.

The 3-methoxy-11β-hydroxy-1,3,5(10)-estratrien-17-one is converted to 11β-hydroxy-19-nortestosterone as shown in Example 7.

EXAMPLE 9

*3-methoxy-11β-acetoxy-1,3,5(10)-estratrien-17-one*

Following the procedure of Example 5 for the conversion of methyl 11α-acetoxy-3-keto-1,4,17(20)-pregnatrien-21-oate to 11α-acetoxy-1,4-androstadiene-3,17-dione, one-half gram of 3-methoxy-19-nor-1,3,5(10),17(20)-pregnatetraene-11β,21-diol 11β,21-diacetate in methylene dichloride solvent is ozonized, the ozonide decomposed, and the product, in methylene dichloride solution, chromatographed over magnesium silicate (Florisil). The fraction eluted with hexane (Skellysolve B) containing ten percent acetone, after recrystallization from methanol weighs 120 milligrams and melts at 220 to 230 degrees centigrade. Highly purified 3-methoxy-11β-acetoxy-1,3,5(10)-estratrien-17-one is obtained by further recrystallization from methanol and melts at 236 to 238 degrees centigrade; rotation $[\alpha]_D^{24}$ of plus 117 degrees in chloroform.

*Analysis.*—Calc'd for $C_{21}H_{26}O_4$: C, 73.66; H, 7.65. Found: C, 73.46; H, 7.60.

In the same manner are prepared other 3-etherified 3-hydroxy-11β-acyloxy-1,3,5(10)-estratrien-17-ones, including those wherein the 3-ether radicals are the etherified hydroxyl radicals named in the foregoing description and the 11β-acyloxy radicals are the esterified hydroxyl radicals named in the foregoing description.

EXAMPLE 10

*3-methoxy-11β-acetoxy-1,3,5(10)-estratrien-17-one*

A mixture of 100 milligrams of 11β-acetoxy-3-methoxy-17α,21-dihydroxy-19-nor-1,3,5(10)-pregnatrien-20-one, 700 milligrams of sodium bismuthate, four milliliters of acetic acid and one milliliter of water is stirred at approximately 26 degrees centigrade for one hour. Then a solution of 3.3 grams of potassium hydroxide in ten milliliters of water is added. The resulting mixture is diluted with methylene dichloride, filtered, the organic layer separated, and the organic solvent evaporated. The residue after recrystallization from methanol provides twenty milligrams of 3-ethoxy-11β-acetoxy-1,3,5(10)-estratrien-17-one melting at 226 to 232 degrees centigrade and identical with the product of Example 9.

In the same manner are prepared other 3-etherified 3-hydroxy-11β-acyloxy-1,3,5(10)-estratrien-17-ones, including those wherein the 3-ether radicals are the etherified hydroxyl radicals named in the foregoing description and the 11β-acyloxy radicals are the esterified hydroxyl radicals named in the foregoing description.

EXAMPLE 11

*3,11β-diacetoxy-1,3,5(10)-estratrien-17-one*

Acylation of 610 milligrams of 19-nor-1,3,5(10),17(20)-pregnatetraene-3,1β,21-triol with acetic anhydride in pyridine (the procedure of Example 1 for the acetylation of methyl 3,11α-dihydroxy-19-nor-1,3,5(10),17(20)-pregnatetraen-21-oate to produce methyl 3,11α-diacetoxy-19-nor-1,3,5(10),17(20)-pregnatetraen-21-oate being followed) provides 660 milligrams of oily 19-nor-1,3,5(10),17(20)-pregnatetraene-3,11β,21-triol 3,11β,21-triacetate which resists crystallization.

In the same manner are prepared, using the appropriate acylating agent, other 19-nor-1,3,5(10),17(20-pregnatetraene-3,11β,21-triol 3,11β,21-triacylates, including those wherein the 3,11β- and 21-acyloxy radicals are the esterified hydroxyl groups named in the foregoing specification.

The oily 19-nor-1,3,5(10),17(20)-pregnatetraene-3,11β,21-triol 3,11β,21-triacetate is dissolved in forty milliliters of methylene dichloride, cooled to a —78 degrees centigrade in a Dry Ice-acetone bath and treated with a ten percent excess of ozone. The ozonide solution obtained is concentrated under vacuum and the ozonide then decomposed by stirring for one hour with five milliliters of acetic acid and 200 milligrams of zinc powder. The product is worked up and chromatographically purified in the usual manner (confer the ozonization procedures of Examples 1 and 2). The product then is recrystallized from methanol to provide 230 milligrams of 3,11β-diacetoxy-1,3,5(10)-estratrien-17-one; melting point 180 to 182 degrees centigrade. Further recrystallization from methanol provides compound melting at 184.5 to 186 degrees centigrade.

Analysis.—Calc'd for $C_{22}H_{28}O_5$: C, 71.33; H, 7.08; mol. wt. 370.4. Found: C, 71.51; H, 6.96; mol. wt. 371.5.

In the same manner are prepared other 3,11β-diacyloxy-1,3,5(10)-estratrien-17-ones, including those wherein the 3 and 11β-acyloxy radicals are the esterified hydroxyl radicals named in the foregoing specification.

EXAMPLE 12

*3-hydroxy-1,3,5(10),9(11)-estratetraen-17-one*

A solution of 2.8 grams of 11β-hydroxy-1,4-androstadiene-3,17-dione, 1.8 grams of N-bromoacetamide, and fifty milliliters of pyridine is prepared and, after standing for approximately five minutes, excess sulfur dioxide is bubbled into the mixture using a water-ice bath for cooling. The reaction mixture then is diluted with methylene dichloride, washed with dilute aqueous hydrochloric acid solution and dried over anhydroxy sodium sulfate. Evaporation of the solvent from the dried solution provides 2.96 grams of residue. This residue is triturated and extracted three times with hot ethyl acetate to remove the desired compound from a residue of acetamide. Concentration of the ethyl acetate extract provides 1.96 grams of 1,3,9(11)-androstatriene-3,17-dione; melting point 164 to 166 degrees centigrade. Further recrystallization from ethyl acetate provides highly purified compound having a rotation $[\alpha]_D^{24}$ plus 102 degrees in chloroform.

Analysis.—Calc'd for $C_{19}H_{22}O_2$: C, 80.81; H, 7.85. Found: C, 80.66; H, 7.96.

Pyrolysis of 1,3,9(11)-androstatriene-3,17-dione, following the procedure of Example 2 for the pyrolysis of 11α-hydroxy-1,4-androstadiene-3,17-dione to 3,11α-dihydroxy-1,3,5(10)-estratrien-17-one, provides a 29 percent yield of 3-hydroxy-1,3,5(10),9(11)-estratetraen-17-one; melting point 255 to 257 degrees centigrade. This compound is convertible to 3-methoxy-1,3,5(10),9(11)-estratetraen-17-one which in turn is convertible to 19-nortestosterone as shown in Example 14. The 3-hydroxy-1,3,5(10),9(11)-estratetraen-17-one also is convertible to estrone as shown in Example 5.

EXAMPLE 13

*3-acetoxy-1,3,5(10),9(11)-estratetraen-17-one*

Acylation of 100 milligrams of 3-hydroxy-1,3,5(10),9(11)-estratetraen-17-one with excess acetic anhydride in pyridine (the procedure of Example 1 for the acetylation of methyl 3-11α-dihydroxy-19-nor-1,3,5(10),17(20)-pregnatetraen-21-oate to obtain 3,11α-diacetoxy-19-nor-1,3,5-(10),17(20)-pregnatetraen-21-oate being followed) provides 100 milligrams of crystalline 3-acetoxy-1,3,5(10),9(11)-estratetraen-17-one.

In the same manner are prepared, using the appropriate acylating agent, other 3-acyloxy-1,3,5(10),9(11)-estratetraen-17-ones, including those wherein the 3-acyloxy radicals are the esterified hydroxyl radicals named in the foregoing description.

By catalytic hydrogenation using a palladium catalyst and hydrogen 3-acetoxy-1,3,5(10),9(11)-estratetraen-17-one is converted to estrone 3-acetate, the procedure for conversion of 3-hydroxy-1,3,5(10),9(11)-estratetraen-17-one to estrone in Example 5 being followed.

EXAMPLE 14

*3-methoxy-1,3,5(10),9(11)-estratetraen-17-one*

A solution of fifty milligrams of 3-hydroxy-1,3,5(10),9(11)-estratetraen-17-one, 1.5 milliliters of methanol and 0.6 milliliter of water containing 0.5 gram of potassium hydroxide is prepared and 0.6 milliliter of dimethyl sulfate is added dropwise with mixing. After about one hour the methanol is evaporated, water added, and the diluted mixture extracted with methylene dichloride. Evaporation of the methylene dichloride from the extract provides a crystalline residue which, recrystallized from hexane (Skellysolve B)-ether mixture, gives fifteen milligrams of 3-methoxy-1,3,5(10),9(11)-estratetraen-17-one melting at 142 to 145 degrees centigrade.

In the same manner are prepared, using the appropriate etherifying agent, other 3-etherified 3-hydroxy-1,3,5(10),9(11)-estratetraen-17-ones, including those wherein the 3-ether radicals are the etherified hydroxyl radicals named in the foregoing description.

3-methoxy-1,3,5(10),9(11)-estratetraen-17-one is converted to 19-nortestosterone as follows: To a solution of 35 milligrams of 3-methoxy-1,3,5(10),9(11)-estratetraen-17-one in fifteen milliliters of ether, one milliliter of ethanol and 25 milliliters of liquid ammonia is added 100 milligrams of lithium metal. After the metal is reacted, the ammonia is evaporated. The intermediate enol ether is extracted with methylene dichloride and recovered from the extract by evaporation of the methylene dichloride. The enol ether is hydrolyzed by dissolving it in a mixture of fifteen milliliters of methanol, 0.5 milliliter of methanol, 0.5 milliliter of hydrochloric acid, and two milliliters of water, and heating the resulting solution under reflux for thirty minutes. The solution is then neutralized with base (NaOH) and the methanol evaporated. The residue is extracted with methylene dichloride and chromatographed over magnesium silicate (Florisil). A fraction eluted with hexane (Skellysolve B) containing 12.5 percent acetone provides nine milligrams of 19-nortestosterone.

Alternatively 3-methoxy-1,3,5(10),9(11)-estratetraen-17-one is converted to esterone 3-methyl ether by hydrogenation with a palladium catalyst and hydrogen following the procedure of Example 5 for the conversion of 3-hydroxy-1,3,5(10),9(11)-estratetraen-17-one to estrone.

EXAMPLE 15

*3-methoxy-1,3,5(10)-estratriene-11,17-dione*

A solution of six milligrams of chromic anhydride, one milliliter of acetic acid, and one drop of water is added to a solution of twenty milligrams of 3-methoxy-11β-hydroxy-1,3,5(10)-estratrien-17-one in 0.5 milliliter of acetic acid. After reacting for thirty minutes the solution is diluted with water and extracted with methylene dichloride. The extract is chromatographed over magnesium silicate (Florisil), the fraction eluted with hexane (Skellysolve B) containing nine percent acetone melting at 193 to 204 degrees centigrade after recrystallization from methanol.

In the same manner are prepared other 3-etherified 3-hydroxy-1,3,5(10)-estratriene-11,17-diones, including those wherein the 3-ether radicals are the etherified hydroxyl radicals named in the foregoing description.

EXAMPLE 16

*3-acetoxy-11β-hydroxy-1,3,5(10)-estratrien-17-one*

A solution of 3,11β-dihydroxy-1,3,5(10)-estratrien-17-one in pyridine is reacted with one molar equivalent of acetic anhydride at room temperature (approximately twenty to thirty degrees centigrade) for four hours. The solution then is poured into a mixture of ice and water to obtain oily product which is extracted with methylene chloride and then chromatographed over magnesium silicate (Florisil) using hexane (Skellysolve B)-acetone mixture for elution to provide 3-acetoxy-11β-hydroxy-1,3,5(10)-estratrien-17-one.

In the same manner are prepared, using the appropriate acylating agent, other 3-acyloxy-11β-hydroxy-1,3,5(10)-estratrien-17-ones, including those wherein the 3-acyloxy radicals are the esterified hydroxyl radicals named in the foregoing description.

EXAMPLE 17

*3-acetoxy-1,3,5(10)-estratriene-11,17-dione*

Following the procedure of Example 15, 3-acetoxy-11β-hydroxy-1,3,5(10)-estratrien-17-one is oxidized with chromic anhydride in moist acetic acid solution to provide 3-acetoxy-1,3,5(10)-estratriene-11,17-dione.

In the same manner are prepared other 3-acyloxy-1,3,5(10)-estratriene-11,17-diones, including those wherein the 3-acyloxy radicals are the esterified hydroxyl radicals named in the foregoing description.

EXAMPLE 18

*3-hydroxy-1,3,5(10)-estratriene-11,17-dione*

A solution of fifty milligrams of 3-acetoxy-1,3,5(10)-estratriene-11,17-dione in ten milliliters of methanol containing fifteen milligrams of sodium methoxide is reacted at room temperature (approximately from twenty to thirty degrees centigrade) for one hour. The solution then is neutralized with a few drops of acetic acid and the solvent evaporated. Chromatography of the residue, in methylene dichloride solution, over magnesium silicate (Florisil) using hexane (Skellysolve B)-acetone mixtures for elution provides 3-hydroxy-1,3,5(10)-estratriene-11,17-dione.

It is to be understood that the invention is not to be limited to the exact details or exact compounds shown and described as obvious modifications and equivalents will be apparent to one skilled in the art, and the invention is therefore to be limited only by the scope of the appended claims.

We claim:
1. Estrone compounds of the formula

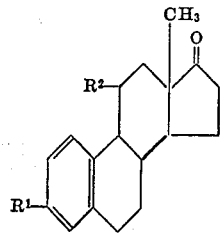

wherein $R^1$ is selected from the group consisting of hydroxy, hydrocarbonoxy, and hydrocarboyloxy; and $R^2$ is selected from the group consisting of hydroxy, hydrocarboyloxy, keto, and hydrogen attached to a 9(11)-double bond; the hydrocarbonoxy and hydrocarboyloxy radicals each containing less than twelve carbon atoms.

2. The compounds of claim 1 wherein hydrocarbonoxy and hydrocarboyloxy radicals are alkoxy and alkanoyloxy radicals, respectively, each containing less than nine carbon atoms.

3. The compounds of claim 1 wherein hydrocarbonoxy and hydrocarboyloxy radicals are methoxy and acetoxy, respectively.

4. 11-ketoestrone.
5. 9(11)-dehydroestrone.
6. 11β-hydroxyestrone.
7. 11α-hydroxyestrone.

References Cited in the file of this patent

UNITED STATES PATENTS 2,756,179    Fried et al. _____ July 24, 1956

OTHER REFERENCES

Slaunwhite et al.: 46, Chem. Abst. 557 (1952).
Butenandt et al.: 41, Chem. Abst. 3476 (1947).

UNITED STATES PATENT OFFICE
Certificate of Correction

Patent No. 2,874,173                                                February 17, 1959

John A. Hogg et al.

It is hereby certified that error appears in the printed specification of the above numbered patent requiring correction and that the said Letters Patent should read as corrected below.

Column 2, line 2, for "Illustrate" read —Illustrative—; column 5, line 71, for "(10),7(20)-" read —(10),17(20)-—; column 7, line 6, for "2,11$\beta$-" read —3,11$\beta$-—; line 59, for "eluted with" read —elution with—; column 8, line 52, for "3-ethoxy-11$\beta$-" read —3-methoxy-11$\beta$-—; line 65, for "-3,1$\beta$,21-" read — -3,11$\beta$,21-—.

Signed and sealed this 14th day of July 1959.

[SEAL]

Attest:
KARL H. AXLINE,
*Attesting Officer.*

ROBERT C. WATSON,
*Commissioner of Patents.*